UNITED STATES PATENT OFFICE.

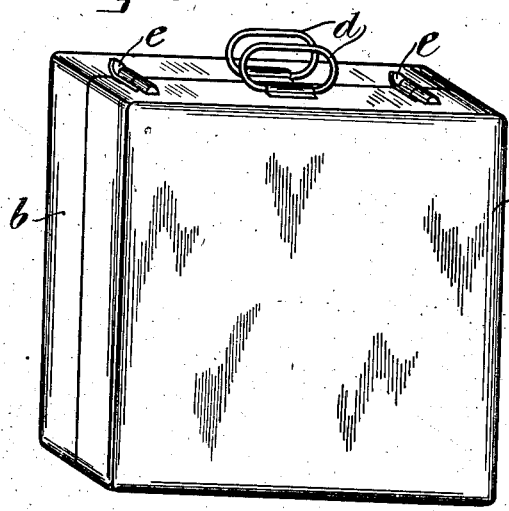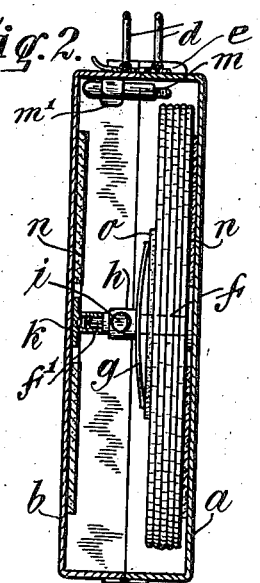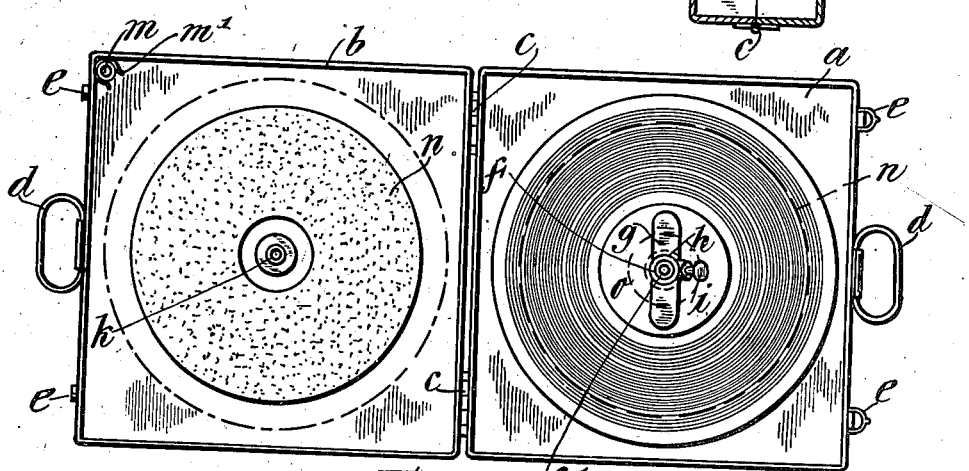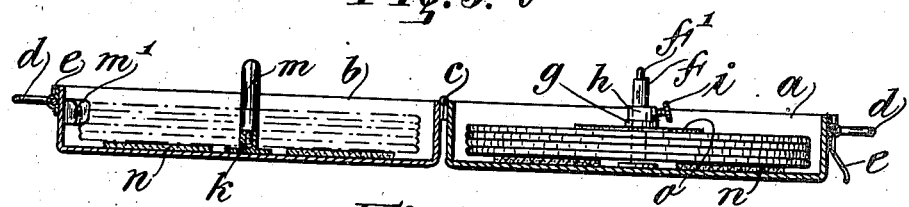

CHARLES R. ALBRECHT, OF NEW YORK, N. Y., AND ADOLPH GOEDECKER, OF HACKENSACK, NEW JERSEY.

CARRIER FOR PHONOGRAPH-RECORDS.

1,320,958. Specification of Letters Patent. Patented Nov. 4, 1919.

Application filed April 18, 1919. Serial No. 290,960.

*To all whom it may concern:*

Be it known that we, CHARLES R. ALBRECHT and ADOLPH GOEDECKER, citizens of the United States, residing, respectively, at Tompkinsville, in the borough of Richmond of the city of New York, in the State of New York, and Hackensack, in the State of New Jersey, have invented certain new and useful Improvements in Carriers for Phonograph-Records, of which the following is a specification, reference being had to the accompanying drawings, forming a part hereof.

In the widespread use of disk phonographs it frequently happens that records have to be transported from place to place, as for the purposes of exchange between friends, or for exhibition, or for circulation from libraries, and it is the purpose of this invention to provide a carrier in which such records can be transported safely and with which they can be handled conveniently in the selection of one record or another. In accordance with the invention the drawing consists of a two-part case, with a pin or stud fixed in one part and provided with a suitable clamp, which pin or stud is engaged with the other part when the carrier is closed, while the removable pin or stud is provided for use in such other part when the carrier is open. The invention will be more fully explained hereinafter with reference to the accompanying drawing in which it is illustrated and in which—

Figure 1 is a view in perspective of the carrier closed.

Fig. 2 is a view of the same in section.

Fig. 3 is a top view of the carrier open.

Fig. 4 is a view of the same in section.

The carrier may be made of wood, fiber, metal or any suitable material and consists of two parts, $a$ and $b$, preferably of substantially equal depth and preferably hinged together at $c$. Each part may be of any suitable dimensions of any suitable shape, although for convenience in manufacture and in use the two parts are preferably rectangular in shape and of a diameter such that they may receive records of the usual size. The two parts of the case may be provided with handles $d$ and also with suitable clips or fastening devices $e$ for securing the two parts together when the carrier is closed. In the center of one of the parts, as $a$, is fixed a pin $f$, on which is mounted a spring plate $g$, with a hub $h$ and set screw $i$. The extremity of the pin or stud $f$ is preferably reduced, as at $f'$ so that it may enter a socket $k$ which is secured centrally to the other member $b$ of the carrier, whereby the pin or stud $f$ is supported at both ends when the carrier is closed and therefore is not likely to be broken off or displaced by the weight of the records thereof. A removable pin or stud $m$ is provided and adapted to be screwed into the socket $k$, when the carrier is open, as shown in Fig. 4, so that records may be transferred readily from one side to the other and held in position. Each member of the carrier may be provided with a suitable pad, as at $n$, and a washer $o$ is provided to be interposed between the spring clamp $g$ and the topmost record on the pin $f$.

When the carrier is to be loaded the spring clamp $g$ and washer $o$ are withdrawn from the pin or stud $f$ and the records are then placed in position and the washer and spring clamp are replaced and pressed down so that the records shall be held firmly in position. When the carrier is closed the end of the pin or stud $f$ enters the socket $k$ of the member $b$ and is so supported at both ends. When the carrier is open, as shown in Figs. 3 and 4, the removable pin or stud $m$ is taken from the spring holder $m^1$ provided therefor in one corner of the member $b$ and is screwed into the socket $k$. When the records in the part $a$ are released they can be transferred from one pin or stud to the other and so held in position.

We claim as our invention:

A carrier for disk records comprising two case members hinged together along one side, means for fastening the case members together along the opposite side, a stud secured centrally in one of the case members, a socket secured centrally to the other of the case members, and a second stud adapted to be secured removably in said socket.

This specification signed this 14th day of April, A. D. 1919.

CHARLES R. ALBRECHT.
ADOLPH GOEDECKER.